(12) United States Patent
Kuche

(10) Patent No.: US 6,459,653 B1
(45) Date of Patent: Oct. 1, 2002

(54) COLLAPSIBLE DEPTH CONTROLLER FOR MOUNTING IN RELATION TO SEISMIC CABLES OR SIMILAR DEVICE

(75) Inventor: Hans-Walter Kuche, Sprockhövel (DE)

(73) Assignee: Petroleum Geo-Services AS, Lysaker (NO)

(*) Notice: Subject to any disclaimer, the term of this patent is extended or adjusted under 35 U.S.C. 154(b) by 0 days.

(21) Appl. No.: 09/446,141

(22) PCT Filed: Jun. 18, 1998

(86) PCT No.: PCT/NO98/00187
§ 371 (c)(1),
(2), (4) Date: Dec. 15, 1999

(87) PCT Pub. No.: WO99/04293
PCT Pub. Date: Jan. 28, 1999

(30) Foreign Application Priority Data

Jul. 18, 1997 (NO) ................................................ 973319

(51) Int. Cl.[7] ................................................ G01V 1/38
(52) U.S. Cl. ............................................ 367/17; 114/245
(58) Field of Search ............................ 367/17, 16, 18; 114/245, 331, 332, 247; 118/110

(56) References Cited

U.S. PATENT DOCUMENTS 3,943,483 A * 3/1976 Strange .................... 340/7 PC
3,961,303 A    6/1976 Paitson
4,711,194 A   12/1987 Fowler
4,748,599 A    5/1988 Gjestrum et al.
5,619,474 A    4/1997 Kuche
6,011,752 A    1/2000 Ambs et al.

* cited by examiner

*Primary Examiner*—Edward Lefkowitz
*Assistant Examiner*—Anthony Gutierrez

(57) ABSTRACT

Collapsible depth controller for mounting in relation to seismic cables or similar devices, comprising two wings, each being rotatably connected to a main body relative to a first axis of rotation perpendicular to the longitudinal direction of the depth controller, to be folded into an adapted room in the main body of the depth controller. The depth controller comprises a first motor for rotation of an at least partially cylindrically shaped cam plate or mushroom cam relative to its axis, the axis essentially corresponding to the longitudinal axis of the depth controller, said cam plate comprising at least one path or cam which along at least part of its length has an angular extension relative to the axis of the cam plate, at least one cam follower engaging into said cam plate and comprising a first coupling device for rotatable connection to the wings, where the first coupling device is positioned at a chosen distance from the first rotational axis of the wing.

5 Claims, 3 Drawing Sheets

COLLAPSIBLE DEPTH CONTROLLER FOR MOUNTING IN RELATION TO SEISMIC CABLES OR SIMILAR DEVICE

This invention relates to a collapsible depth controller for mounting in relation to seismic cables or similar, comprising two wings, each being rotatably coupled to the main body relative to a first rotational axis perpendicular to the longitudinal direction of the depth controller, to be foldable into an suitable room in the main body of the depth controller.

In towing a seismic cable, e.g. a hydrophone cable, in connection seismic studies it is important to control the level of the cable relative to the water surface and the bottom. Deviations from the correct position may result in inaccurate measurements, an in the worst case erroneous measurements, which may result in drilling for oil resources in wrong places, or in not drilling at all.

A number of different depth controllers are known. One example is shown in Norwegian patent application no. 96.0506, which is especially aimed at a wing construction for optimizing the lift. They are effective, but are impractical when the cable is wound in or laid out. When a cable is wound in, e.g. in bad weather or for maintenance, the winches must be stopped and the depth controller removed before the winding continues.

With a system comprising eight cables, each with sixteen depth controllers, and where it takes 30 seconds to remove each depth controller, it will take up to one hour extra to take the system in. Correspondingly the operation of laying the cable out will take twice as long, as each depth controller must be tested. The use of a depth controller that does not have to be removed from the cable will thus save a large amount of time. In bad weather a fast withdrawal of a seismic cable may also avoid damages on the equipment mounted on the cable.

When letting the cable out the wings may be unfolded after the depth controller has left the aft of the vessel, so that damages on the wings are avoided. Correspondingly, the wings may be temporarily folded when there is a danger for collisions between the cables or collisions with stray object found at sea, which may damage the depth controller. U.S. Pat. No. 3.943.483 describes a collapsible depth controller with wings which may be unfolded to provide a lift. A problem with the solution described in this patent is that the mechanism for controlling the lift of the depth controller is complicated, and thus sensitive to damages. The depth controller in the US patent comprises two sets of wings for positive and negative lift, respectively. The wings are unfolded using a piston rod which through hinges is connected to rods which in turn pushes the wings. The wings are rotatably coupled to the depth controller in one of their ends.

In U.S. Pat. No. 3.961.303 a similar solution is shown in which the negative lift may be adjusted, but which comprises a constant positive lift.

Both the abovementioned solutions are mechanical (pneumatic) and are folded over the cable on suitable fastening devices. Therefore they are relatively large and are not suited to stay on the cable. The need for two different wings for adjusting the position under the sea surface make the solutions unnecessarily complicated, and does not provide the same possibility for varying the lift an conventional depth controllers.

It is thus an object of this invention to provide a robust, collapsible depth controller being sufficiently compact to be laid out or pulled in without being removed from the cable, or which when in use is as flexible as conventional depth controllers. This is obtained using a depth controller as described above, being characterized in that the depth controller comprises a first motor for rotation of one at least partially cylindrically shaped cam plate about its axis, the axis essentially corresponding to the longitudinal axis of the depth controller, said cam plate (mushroom cam) comprising at least one trace or cam which in at least part of its length is slanting relative to the axis of the cam plate, at least one cam follower engaging into said cam plate an comprising a first coupling device for rotatable coupling to the wings, said first coupling device being positioned at a chosen distance from the first rotational axis of the wing.

In an especially preferred embodiment each wing is also rotatably coupled to the depth controller relative to a second axis being parallel to the longitudinal direction of the wing, and that the wing at a chosen distance from this axis is coupled to a second cam follower engaging in the cam plate to provide for a possible rotation of the wing relative to the second axis by rotating the cam plate. This way a possibility is provided for controlling the angle of the wings, and thus their lift, using the same cam plate. Thus a flexible and simple solution is provided with good possibilities for adjusting the lift.

When the wings are unfolded it is usually necessary to adjust the orientation of the wings, so that they are unfolded in the horizontal plane. This is solved according to a preferred embodiment of the invention in that the depth controller comprises a coaxially positioned core firmly connected to the cable, and a second motor for rotating the main body of the depth controller relative to the core. The orientation of the depth controller may be measured using a gravimeter or similar.

The invention will be described more closely referring to the enclosed drawings, which show one of many possible embodiments of the invention.

Figure 1:
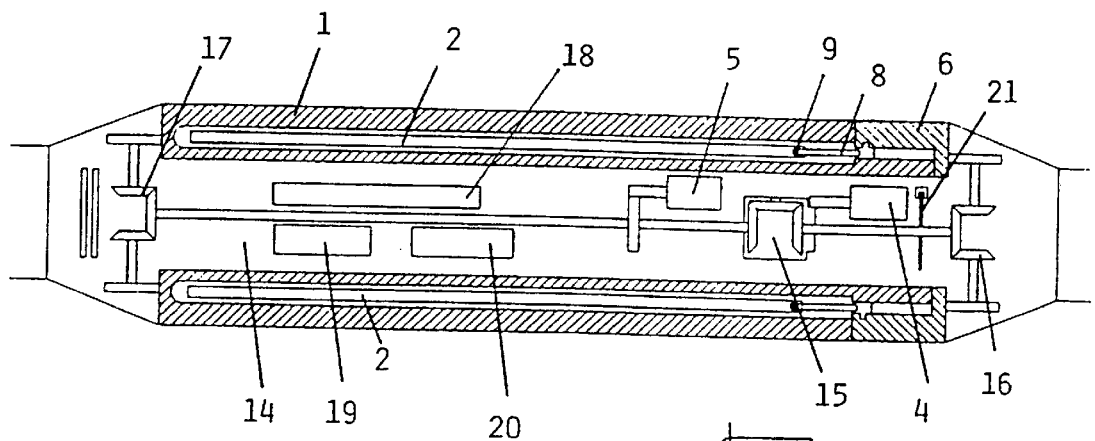
FIG. 1 shows a longitudinal section of the depth controller.

In FIG. 1 an example is shown of a depth controller comprising a main body 1. The main body 1 constitutes a cylinder which encloses a core 14 and positioned coaxial with the cable. The wings 2 are folded into the main body and are thus positioned with a certain distance from the axis of the depth controller. The folding of the wings is controlled using a coupling device 9, a cam follower 8 and cylindrically shaped cam plate or mushroom cam 6, which will be described more in detail below. The cam plate 6 is rotated around the axis of the depth controller using a differential coupling 15 and a gear 16 using a first motor 4.

A second motor 5 is coupled through a gear 17 to the main body 1, so that it may be rotated. Thus the wings 2 may be brought in the right orientation relative to the horizontal plane. In order to prevent the rotation of the main body from affecting the position of the cam plate relative to the main body the first and the second motor is coupled to each other through a differential connection 15. The first motor 4 may thus rotate the cam plate 6 relative to the main part 1, with following changes in the positions of the wings, while a rotation of the main body will give a corresponding rotation of the cam plate, and therefore not affect the wings 2.

To control the positions of the main body and the wings a detector unit 21 may be positioned along the axle which controls the cam plate 6, registering the rotation of the axle. A corresponding unit may possibly be used at te axle connected to the second motor 5, thus providing a control of the relative positions of the cam plate and the main body 1.

Different types of control circuits and power supplies 18,19,20 are in FIG. 1 positioned in the core of the depth controller. These may comprise instruments e.g. for measuring gravitation, control devices and power supplies. The instrument for measuring of gravitation may be used to provide a reference signal which, through a control circuit and the second motor 5, ensures that the main body 1, and thus the wings 2, are kept in the correct, preferably horizontal, orientation. corresponding conductors and fastening devices are, for simplicity, not shown. The control circuits 18,19,20 may be of any suitable type, and will not be described in detail here. In stead of the gravitation measuring instrument a number of other corresponding instruments may be used, e.g. a gyroscope.

Figure 2:
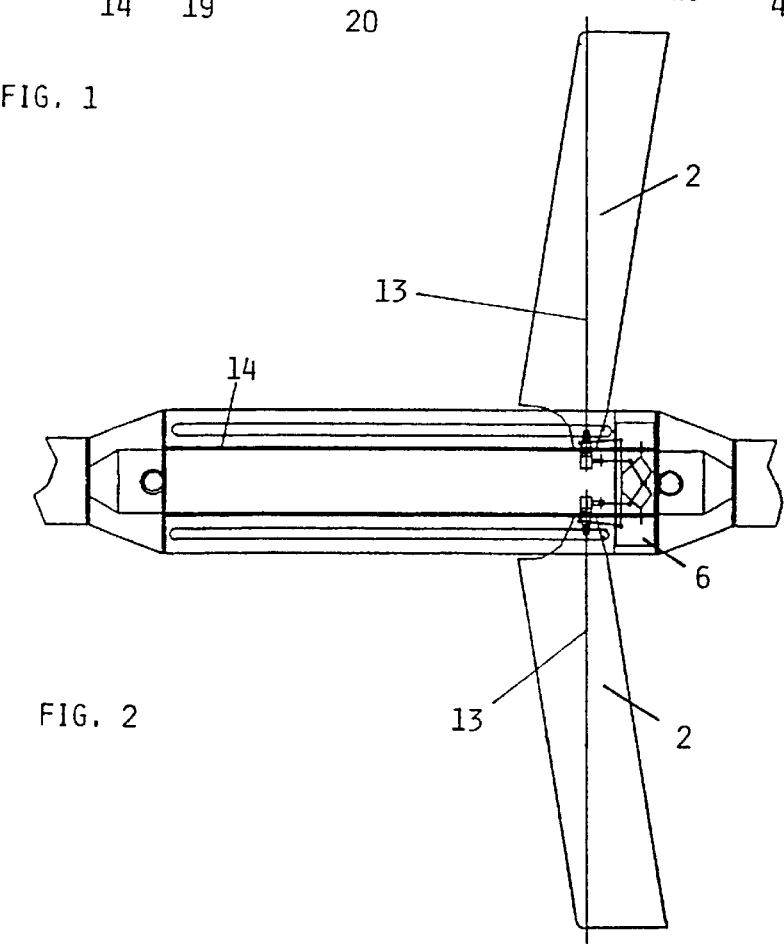
FIG. 2 shows in a corresponding manner the depth controller with the wings unfolded.

FIG. 2 shows a simplified sketch of the depth controller in FIG. 1, with the wings unfolded.

Figure 3A:
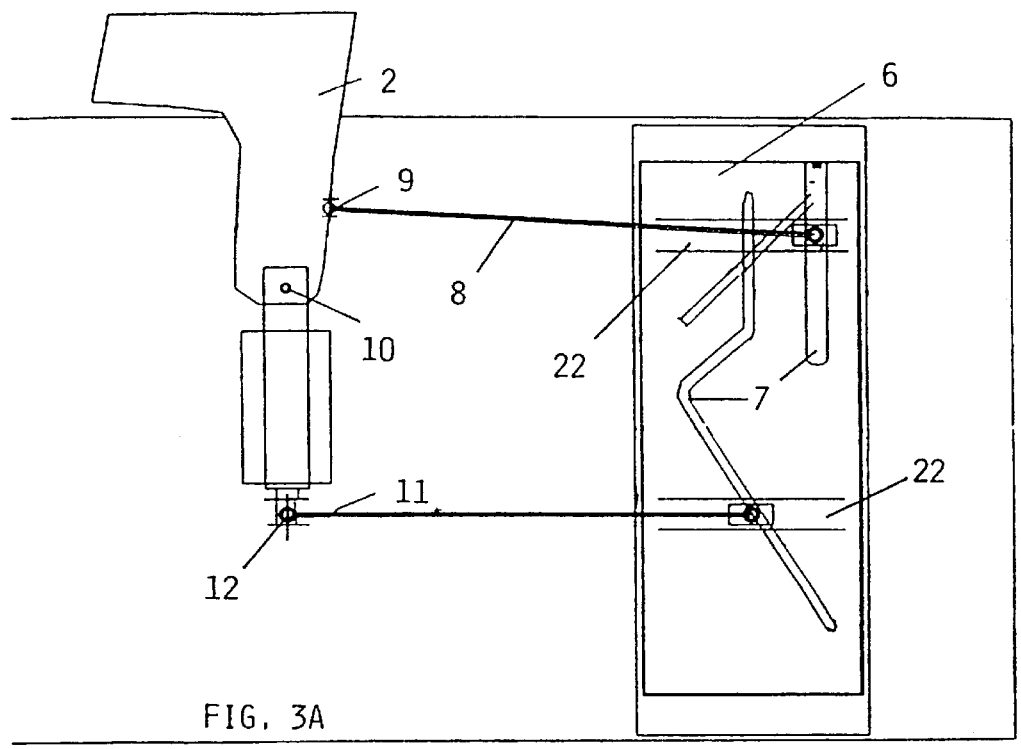
FIG. 3A shows a detail of the control mechanism in one embodiment of the invention.
Figure 3B:
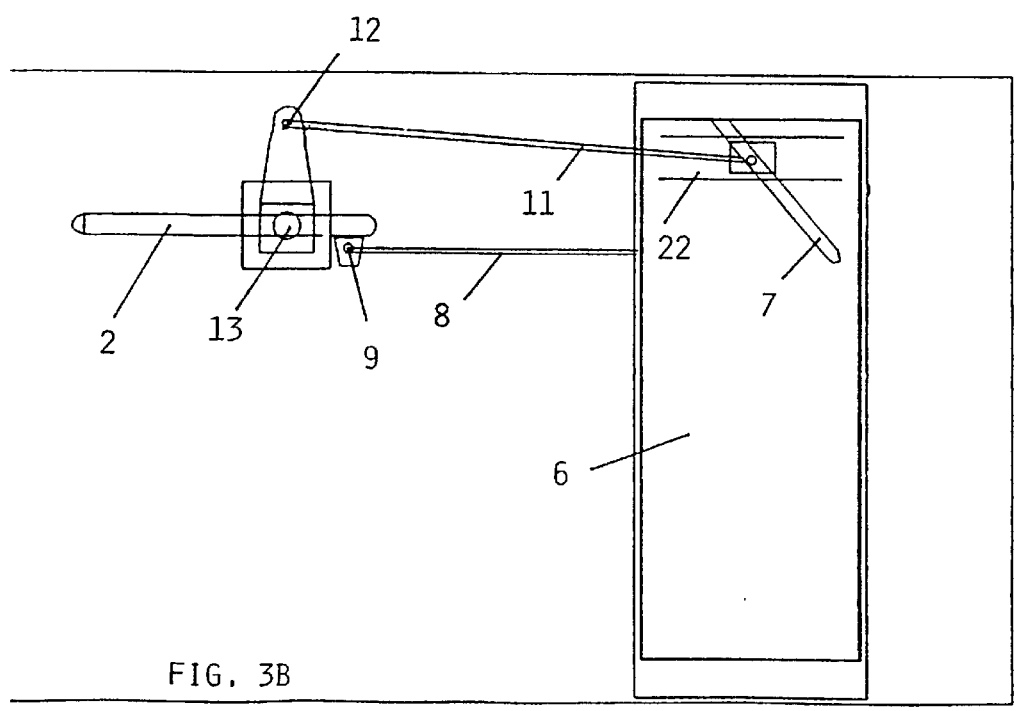
FIG. 3B shows the same detail as FIG. 3A, as seen from another side.

FIGS. 3A and 3B illustrates how the controlling of the wings may be performed. The cam plate or cam plate comprises one or more paths 7, and a cam follower engages into the path 7, and is kept in a firm, tangential position of a glide path 22 in the main body 1. The path 7 has parts being angular relative to the rotational direction of the cam plate, so that the cam follower, when being in one of these parts, is pushed in the axial direction of the depth controller. The cam follower is coupled to the wing 2 with a coupling device 9 being positioned at a chosen distance from the rotational axis 10 of the wing. Thus a rotation of the cam plate 6, via the path 7, give an axial movement of the cam follower 8, which gives a rotation of the wing 2 relative to the axis 10, resulting in that the wing is folded in or out of the main body 1.

In a similar manner a cam follower 11 is in a preferred embodiment of the invention connected to a second coupling device 12 on the wing 2. The wing is rotatably connected to the main body such that it may be rotated relative to an axis essentially parallel to the length of the wing, the second coupling device 12 being mounted at a chosen distance from the second rotational axis 13 of the wing. Thus a rotation of the cam plate may in a corresponding way move the second cam follower 11 which leads to a rotation of the wing 2 relative to the second axis 13, which may be used to change the angle of the wing, and thus the lift. The angle between the rotational axis 13 and the longitudinal direction of the wing may vary somewhat depending on the shape of the wing and how it is moved to adjust the lift.

Figure 4:
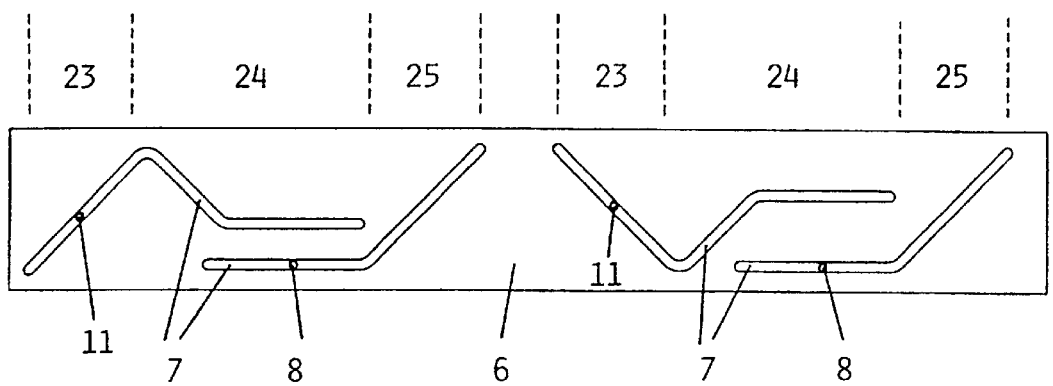
FIG. 4 illustrates an embodiment of the cam plate according to the invention.

The control of the wing is thus given by the shape of the path or paths 7 in the cam plate 6. In FIG. 4 the cam plate, which preferably is cylindrical in shape, is for illustration purposes drawn flat, and shows four different paths 7 adapted to guide one cam follower 8,11. The right and the left sides of the drawing in FIG. 4 illustrate the paths controlling the right and the left wings, respectively. As the cam followers in this embodiment are positioned in different positions along the circumference of the cam plate the paths are also shifted along the circumference.

The first part 23 from the left the second cam followers 11 are in a angular portion which provides a tilting movement of the wings when rotating the cam plate, and thus variations in the lift of the wing. The first cam followers will then be in a flat portion 24, and keep the wings unfolded. The angular path portions 23 to the left in the two halves of are tilted the opposite way so that the wings, which are positioned on opposite sides of the real, cylindrical cam plate, shall tilt the same way when the cylindrical cam plate 6 is rotated.

When the cam plate 7 is rotated toward the right the second cam followers 11 are lead into a flat portion 24, and are thus lead into a neutral position, so that they (the wings) fit into the openings in which they are folded, while the first cam follower 8 comes into the angular path portions 25, which fold the wings into the main body.

This way the positions and tilting of the wings are controlled using one motor, thus providing a simple and robust solution.

What is claimed is:

1. Collapsible depth controller for mounting in relation to seismic cables or similar devices, comprising two wings (2), each being rotatably connected to a main body (1) relative to a first axis of rotation perpendicular to the longitudinal direction of the depth controller, to be folded into a fitted room in the main body of the depth controller (1), characterized in that the depth controller comprises a first motor (4) for rotation of an at least partially cylindrically shaped cam plate (6) relative to its axis, the axis essentially corresponding to the longitudinal axis of the depth controller, said cam plate (6) comprising at least one path or cam (7) which along at least part of its length has an angular extension relative to the axis of the cam plate, at least one cam follower (8) engaging into said cam plate and comprising a first coupling device (9) for rotatable connection to the wings (2), where the first coupling device (9) is positioned at a chosen distance from the first rotational axis (10) of the wing.

2. Collapsible depth controller according to claim 1, characterized in that each wing (2) is also rotatably connected to the depth controller relative to a second axis (13), and that the wing in a chosen distance from this axis is connected to a second cam follower (11) engaging in the cam plate to provide for rotation of the wing relative to the second axis (13) when rotating the cam plate (6).

3. Depth controller according to one of the preceding claims, characterized in that it comprises a coaxial core (14) being firmly mounted in the cable, and a second motor (5) for rotation of the main body of the depth controller (1) relative to the core.

4. Depth controller according to claim 3, characterized in that the first motor (4) is also positioned in the core and that the first and the second motors are connected through a differential gear (15).

5. Depth controller according to one of the preceding claims 2–4, characterized in that the cam plate comprises one or more paths (7) adapted to a coordinate movements of the first and the second cam follower (8,11), so as to let the second cam follower (11) maintain the angle of the wing in a neutral position when the wing (2) is folded in or out, and the first cam follower (8) keeps the wing (11) in a certain position when the second cam follower (11) adjust the angle of the wing.

* * * * *